US012587236B2

(12) United States Patent (10) Patent No.: US 12,587,236 B2
Arai et al. (45) Date of Patent: Mar. 24, 2026

(54) CONTROL METHOD AND WIRELESS COMMUNICATION SYSTEM

(71) Applicant: NTT, Inc., Tokyo (JP)

(72) Inventors: Takuto Arai, Musashino (JP); Daisei Uchida, Musashino (JP); Tatsuhiko Iwakuni, Musashino (JP); Shuki Wai, Musashino (JP)

(73) Assignee: NTT, Inc., Tokyo (JP)

( * ) Notice: Subject to any disclaimer, the term of this patent is extended or adjusted under 35 U.S.C. 154(b) by 53 days.

(21) Appl. No.: 18/290,421

(22) PCT Filed: May 17, 2021

(86) PCT No.: PCT/JP2021/018543
§ 371 (c)(1),
(2) Date: Nov. 13, 2023

(87) PCT Pub. No.: WO2022/244035
PCT Pub. Date: Nov. 24, 2022

(65) Prior Publication Data
US 2024/0250718 A1     Jul. 25, 2024

(51) Int. Cl.
*H04B 7/02*        (2018.01)
*H04B 7/024*       (2017.01)
(Continued)

(52) U.S. Cl.
CPC ............ *H04B 7/024* (2013.01); *H04W 28/08* (2013.01); *H04W 28/18* (2013.01)

(58) Field of Classification Search
CPC ....... H04B 7/024; Y02D 30/70; H04W 28/08; H04W 28/18; H04W 88/085
See application file for complete search history.

(56) References Cited

U.S. PATENT DOCUMENTS 11,690,008 B2 *   6/2023   Berg ................. H04W 52/0206
                                                                370/311
2004/0235481 A1    11/2004  Shimizu
(Continued)

FOREIGN PATENT DOCUMENTS

EP           2753142 A1    7/2014
JP       2011-029713 A     2/2011
(Continued)

OTHER PUBLICATIONS

China Mobile Research Institute: "C-RAN, The Road Towards Green RAN", Internet Citation, Oct. 1, 2011, pp. 1-48.
(Continued)

*Primary Examiner* — Dac V Ha

(57)          ABSTRACT

One aspect of the present invention is a control method in a wireless communication system including a plurality of distributed antennas that perform wireless communication with a user terminal, and a plurality of signal processing units that are connected to the plurality of distributed antennas and perform signal processing, the control method including: an initial assignment step of assigning a distributed antenna to be connected to a signal processing unit; an acquisition step of acquiring load information indicating loads of the signal processing unit; a determination step of determining whether to reassign the distributed antenna to be connected to the signal processing unit on the basis of the load information acquired in the acquisition step; and a reassignment step of performing reassignment and leveling loads of the plurality of signal processing units when it is determined to reassign in the determination step.

7 Claims, 6 Drawing Sheets

(51)  Int. Cl.
      *H04W 28/08*          (2023.01)
      *H04W 28/18*          (2009.01)

(56)                    References Cited

U.S. PATENT DOCUMENTS

| | | |
|---|---|---|
| 2010/0195497 A1 | 8/2010 | Iyer et al. |
| 2012/0115484 A1 | 5/2012 | Takahashi |
| 2012/0208581 A1* | 8/2012 | Ishida .................. H04B 7/0691 |
| | | 455/562.1 |
| 2015/0223113 A1 | 8/2015 | Matsunaga |
| 2020/0221473 A1 | 7/2020 | Krishnaswamy et al. |
| 2021/0051765 A1* | 2/2021 | Rosenschild .......... H04B 7/024 |
| 2021/0399768 A1* | 12/2021 | Hessler ................ H04B 7/0413 |
| 2024/0259817 A1* | 8/2024 | Arai ...................... H04W 16/08 |

FOREIGN PATENT DOCUMENTS

| | | | |
|---|---|---|---|
| JP | 2016-208227 A | 12/2016 | |
| WO | WO-03/077587 A1 | 9/2003 | |
| WO | 2013/123670 A1 | 8/2013 | |
| WO | WO-2014/034118 A1 | 3/2014 | |

OTHER PUBLICATIONS

White Paper 5G Sophistication and 6G, Jul. 2020 (Version 2.0), NTT Docomo, Inc.
Kota Ito et al., "A novel centralized beamforming scheme for radio-over-fiber systems with fixed wavelength allocation", IEICE Communications Express, vol. 1, pp. 1-6, 2019.

* cited by examiner

FIG. 2

CONTROL METHOD AND WIRELESS COMMUNICATION SYSTEM

CROSS-REFERENCE TO RELATED APPLICATIONS

This application is a 371 U.S. National Phase of International Application No. PCT/JP2021/018543, filed on May 17, 2021. The entire disclosure of the above application is incorporated herein by reference.

TECHNICAL FIELD

The present invention relates to a technology of a control method and a wireless communication system.

BACKGROUND ART

In the fifth generation mobile communication system (5G), a high frequency band of a millimeter wave band is used, and use of a further higher frequency band capable of securing a wider bandwidth is assumed in order to achieve further increase in speed and capacity in a future wireless system such as the 6G.

A high frequency band is known to have a large propagation loss and high straightness, and a distributed antenna system has been studied in order to improve connectivity in covering a communication area (see Non Patent Literature 1).

FIG. 5 illustrates an example of a general base station configuration. The base station configuration in FIG. 5 includes a base band unit (BBU) in which processing of a layer higher than a physical layer is performed, a remote radio head (RRH) that may include RF processing and a part of the physical layer, and an antenna. The UE indicates a user terminal. The antenna may be extended from or integrated with the RRH.

FIG. 6 illustrates an example of a base station configuration of a distributed antenna system. The base configuration in FIG. 6 includes a BBU, an RRH, and an antenna as in FIG. 5. In the base station configuration of FIG. 6, a plurality of antennas are extended from the RRH, and the same cell is covered by the plurality of antennas. As a result, in the base station configuration of FIG. 6, the communication area can be expanded. Further, by performing multiple input and multiple output (MIMO) in cooperation of a plurality of antennas, an increase in communication capacity can also be expected.

CITATION LIST

Non Patent Literature

Non Patent Literature 1: NTT DOCOMO, INC., "DOCOMO 6G White Paper 2.0 version", July 2020
Non Patent Literature 2: K. Ito, M. Suga, Y. Shirato, N. Kita, and T. Onizawa, "A novel centralized beamforming scheme for radio-over-fiber systems with fixed wavelength allocation", IEICE Communications Express, Vol. 8, No. 12. pp. 584-589, 2019.

SUMMARY OF INVENTION

Technical Problem

In the case of the base station configuration as illustrated in FIGS. 5 and 6, the antenna and the cell resource are fixedly associated with each other. Therefore, in the base station configuration as illustrated in FIGS. 5 and 6, it is not possible to follow the temporal variation of the load, for example, distribution of the traffic amount and the number of connected users is biased depending on the cell. As a result, there is a high probability of causing a decrease in throughput, cell resource shortage of surplus, or the like.

In the existing technology, resource control across a plurality of areas in one cell resource can be performed by copying and distributing one cell resource to a plurality of antennas in the base station configuration as illustrated in FIG. 6, but resource control across a plurality of cell resources cannot be performed.

In view of the above circumstances, an object of the present invention is to provide a technology capable of achieving a control method and a wireless communication system capable of following a variation of a load.

Solution to Problem

One aspect of the present invention is a control method in a wireless communication system including a plurality of distributed antennas that perform wireless communication with a user terminal, and a plurality of signal processing units that are connected to the plurality of distributed antennas and perform signal processing, the control method including: an initial assignment step of assigning a distributed antenna to be connected to a signal processing unit; an acquisition step of acquiring load information indicating a load of the signal processing unit; a determination step of determining whether to reassign the distributed antenna to be connected to the signal processing unit on the basis of the load information acquired in the acquisition step; and a reassignment step of performing reassignment and leveling the loads of the plurality of signal processing units when it is determined to reassign in the determination step.

One aspect of the present invention is a control method in a communication system including a plurality of distributed antennas that perform wireless communication with a user terminal, and a plurality of signal processing units to which the plurality of distributed antennas are assigned and that perform processing related to a signal to be transmitted and received to and from the plurality of assigned distributed antennas, the control method including: an acquisition step of acquiring load information indicating a load of a signal processing unit; and an assignment step of assigning a distributed antenna to the signal processing unit such that loads of the plurality of signal processing units are leveled on the basis of the load information acquired in the acquisition step.

One aspect of the present invention is a wireless communication system including a plurality of distributed antennas that perform wireless communication with a user terminal, and a plurality of signal processing units that are connected to the plurality of distributed antennas and perform signal processing, the wireless communication system including: an initial assignment unit (hereinafter also referred to as "assignor") that assigns a distributed antenna to be connected to a signal processing unit; an acquisition unit (hereinafter also referred to as "acquirer") that acquires load information indicating loads of the signal processing unit; a determination unit (hereinafter also referred to as "determiner") that determines whether to reassign the distributed antenna to be connected to the signal processing unit on the basis of the load information acquired by the acquisition unit; and a reassignment unit (hereinafter also referred to as "re-assignor") that performs reassignment and levels loads of the plurality of signal processing units when it is determined to reassign by the determination unit.

Advantageous Effects of Invention

According to the present invention, it is possible to achieve a control method and a wireless communication system capable of following a variation of a load.

BRIEF DESCRIPTION OF DRAWINGS

FIG. 2 is a block diagram illustrating a configuration or the like of a CS 100.

DESCRIPTION OF EMBODIMENTS

Embodiments of the present invention will be described in detail with reference to the drawings.

Figure 1:
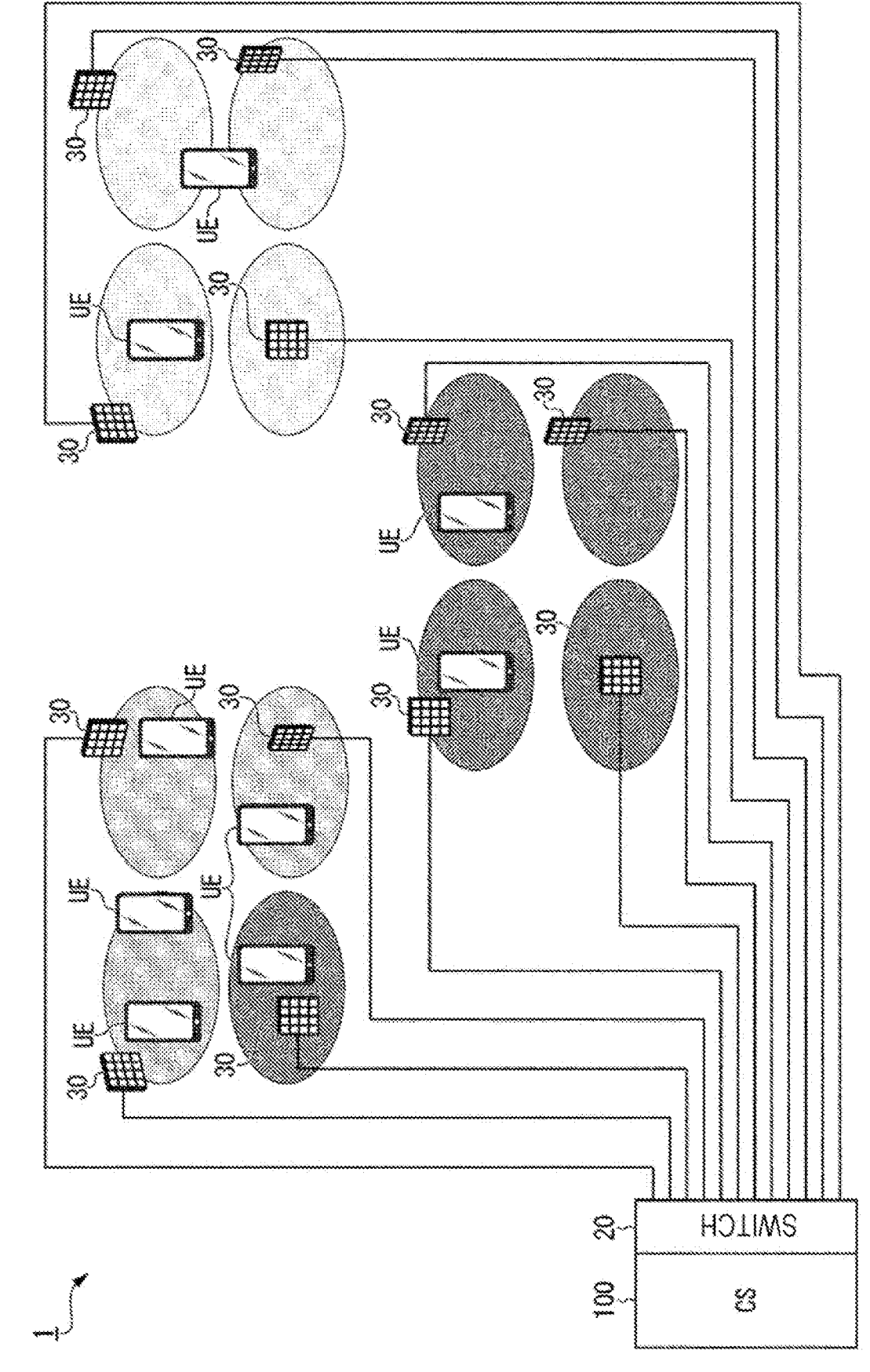
FIG. 1 is a block diagram illustrating a configuration of a wireless communication system 1.

FIG. 1 is a block diagram illustrating a configuration of a wireless communication system 1 in an embodiment. The wireless communication system 1 includes a central station (CS) 100, a switch 20, and a distributed antenna 30. The UE indicates a user terminal.

The wireless communication system 1 uses an analog radio over fiber (RoF) technology. Specifically, waveform information of an analog signal is transmitted from the CS 100 to an extended station provided with the distributed antenna 30 via an optical fiber. As a result, by integrating the signal processing functions into the CS 100, the extended station only requires to have functions such as the distributed antenna 30, an amplifier, E/O conversion, and O/E conversion, so that downsizing and power saving of the extended station can be achieved.

The CS 100 communicates with the distributed antenna 30 via the switch 20. The CS 100 performs remote beam control corresponding to a beamforming technology only by an aggregation station. The switch 20 is connected to the distributed antenna 30 and the CS 100. The switch 20 dynamically assigns the distributed antenna 30 to the plurality of signal processing units provided in the CS 100 under the control of the CS 100.

Figure 2:
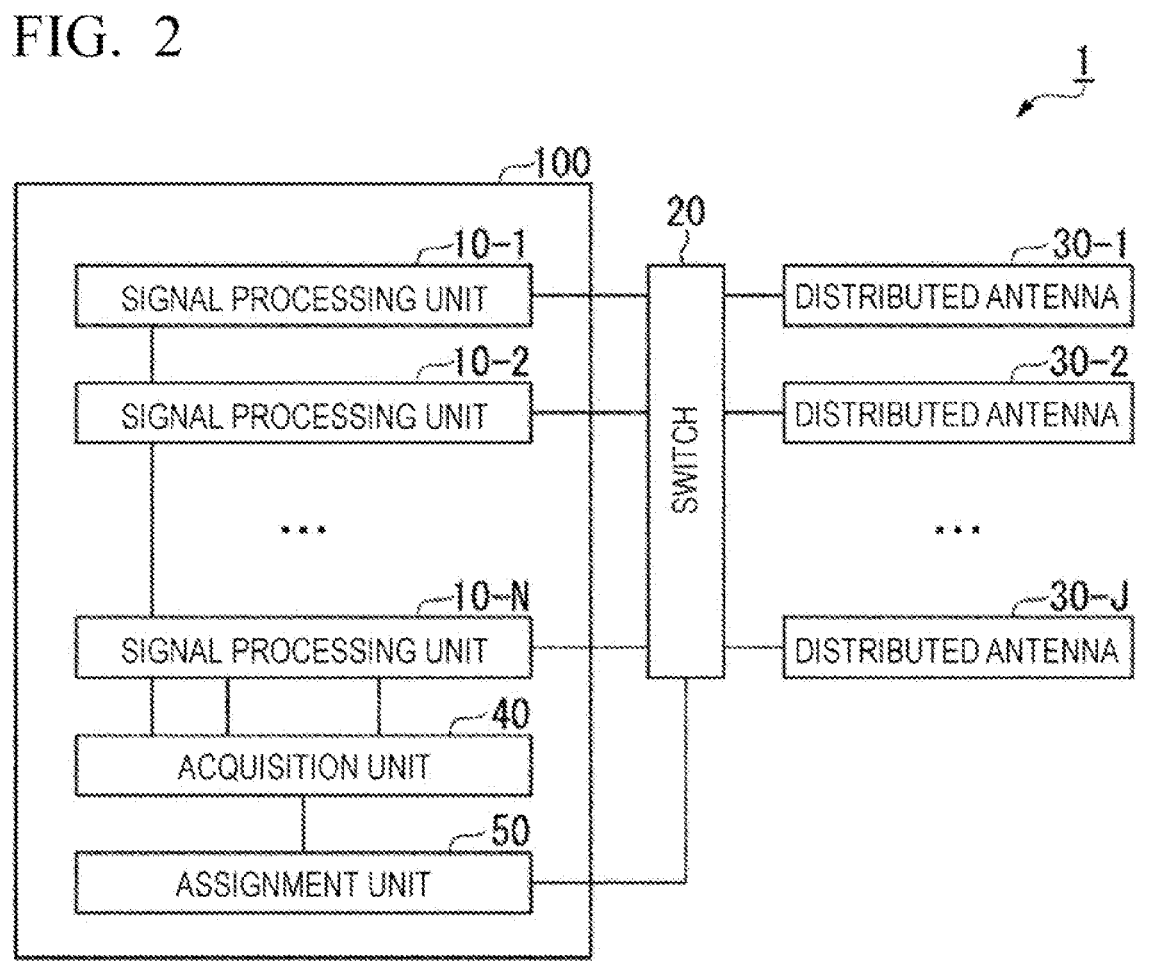

FIG. 2 is a block diagram illustrating a configuration or the like of the CS 100. The CS 100 includes N (N is an integer of 2 or more) signal processing units 10-1, 10-2, . . . , and 10-N, an acquisition unit 40, and an assignment unit 50. Each of the signal processing units 10-1, 10-2, . . . , and 10-N is expressed as a signal processing unit 10 unless otherwise distinguished. In the configuration of FIG. 2, J (J is an integer of 2 or more) distributed antennas 30-1, 30-2, . . . , and 30-J are provided. Each of the distributed antennas 30-1, 30-2, . . . , and 30-J is expressed as a distributed antenna 30 unless otherwise distinguished.

The signal processing unit 10 performs various types of processing on a signal received from a host device (not illustrated) and outputs the processed signal to the distributed antenna 30. The signal processing unit 10 performs various types of processing on the signal received from the distributed antenna 30 and outputs the processed signal to the host device.

Several distributed antennas 30 are assigns to the signal processing unit 10. The distributed antenna 30 assigned to each signal processing unit 10 can be changed by using the switch 20 under the control of the assignment unit 50.

The acquisition unit 40 acquires load information indicating the load of the signal processing unit 10 for each signal processing unit 10. In the present embodiment, the load information is information indicating the number of connected user terminals that perform wireless communication with the distributed antenna, the user throughput in the user terminal, the number of traffic buffers in the signal processing unit 10, or the calling failure rate in the signal processing unit 10, but is not limited thereto.

The assignment unit 50 assigns the distributed antenna 30 to the signal processing unit 10 so that the loads of the plurality of signal processing units 10 are leveled on the basis of the load information acquired by the acquisition unit 40. Specifically, the assignment unit 50 perform dynamic assignment to each signal processing unit 10 in units of the distributed antenna 30 on the basis of the load information in each signal processing unit 10. When the assignment is performed, the load of the signal processing unit 10 is leveled by taking over the assigned distributed antenna 30 and the user to be connected to the distributed antenna 30 to the newly assigned signal processing unit 10.

Figure 3:
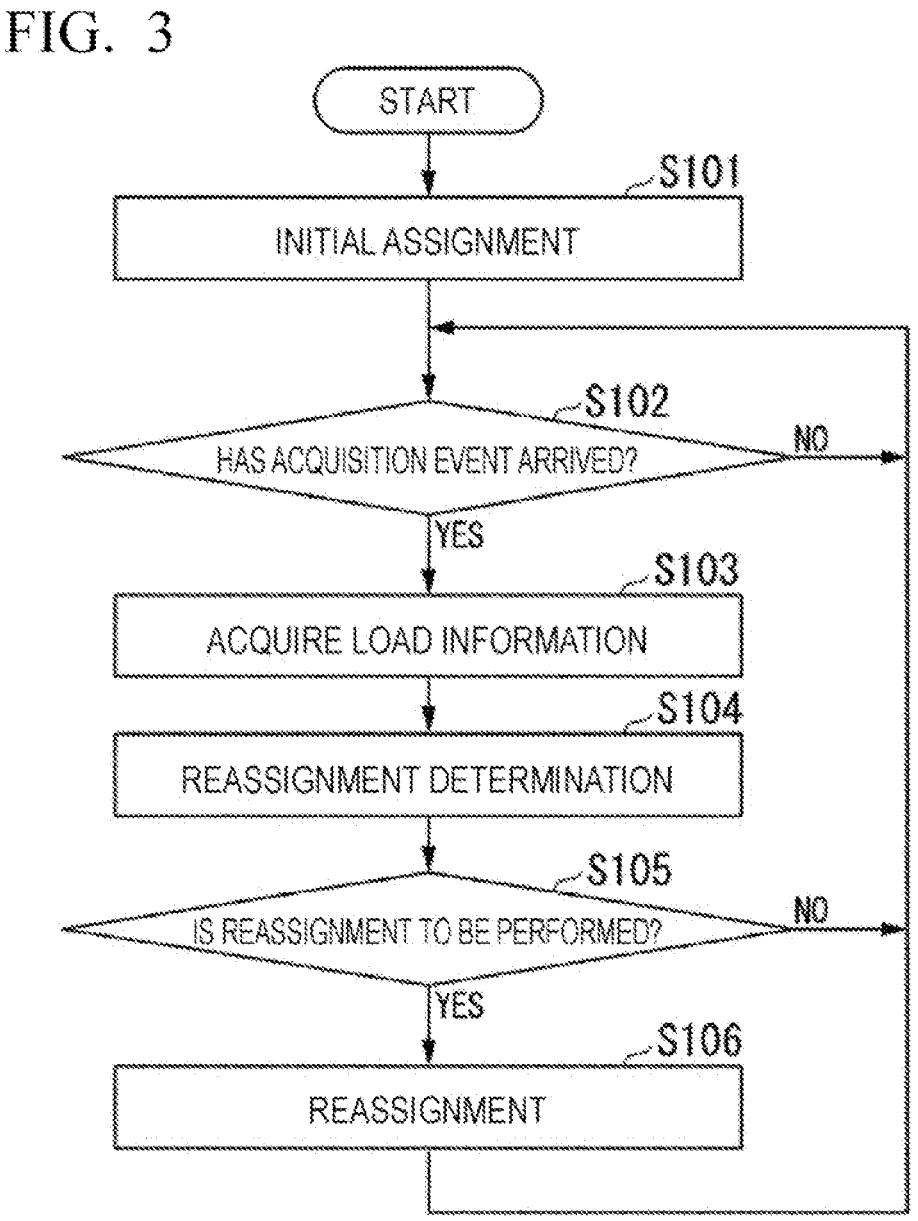
FIG. 3 is a flowchart illustrating a flow of processing of the CS 100.
Figure 4:
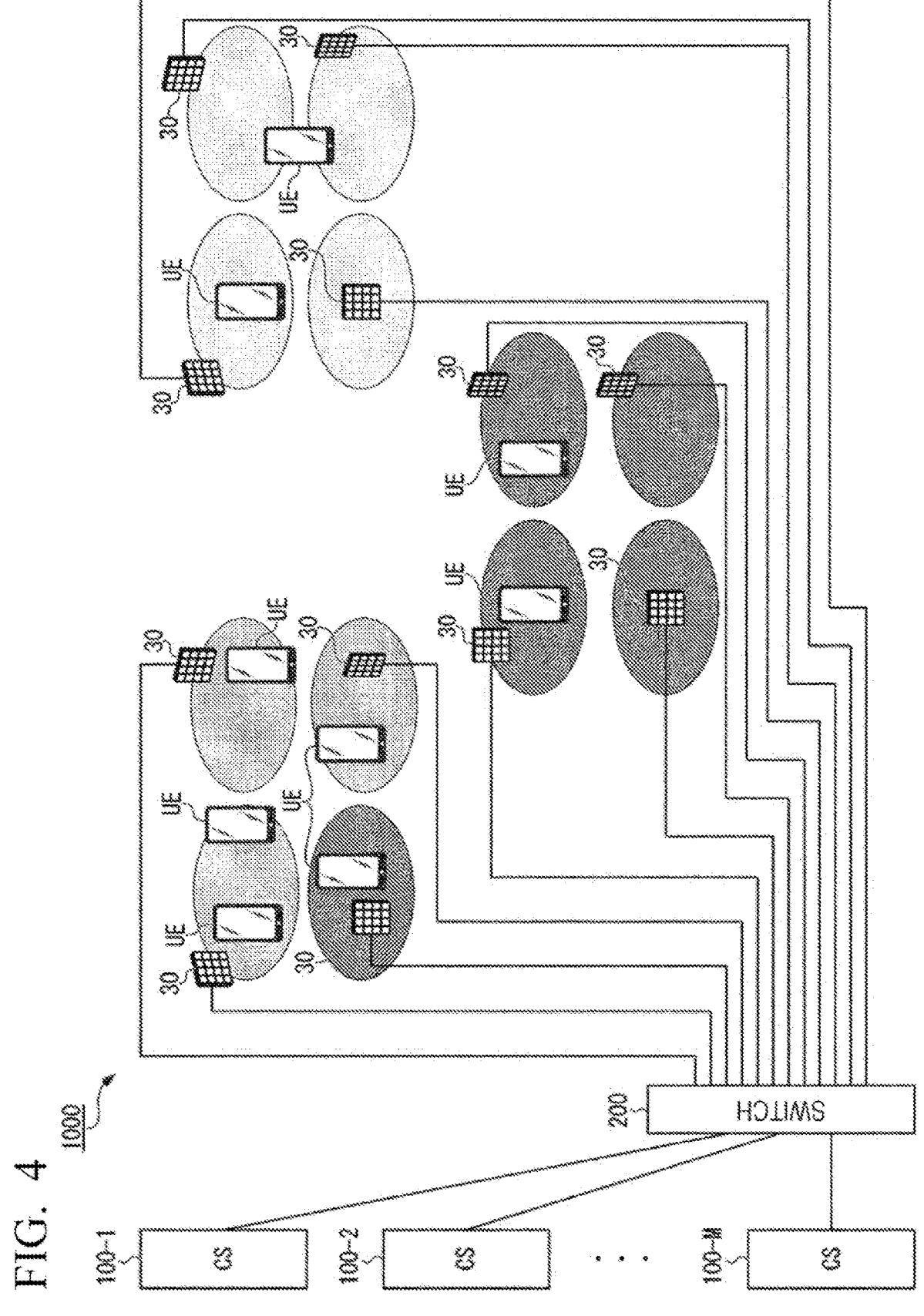
FIG. 4 is a diagram illustrating a modification of the wireless communication system.
Figure 5:
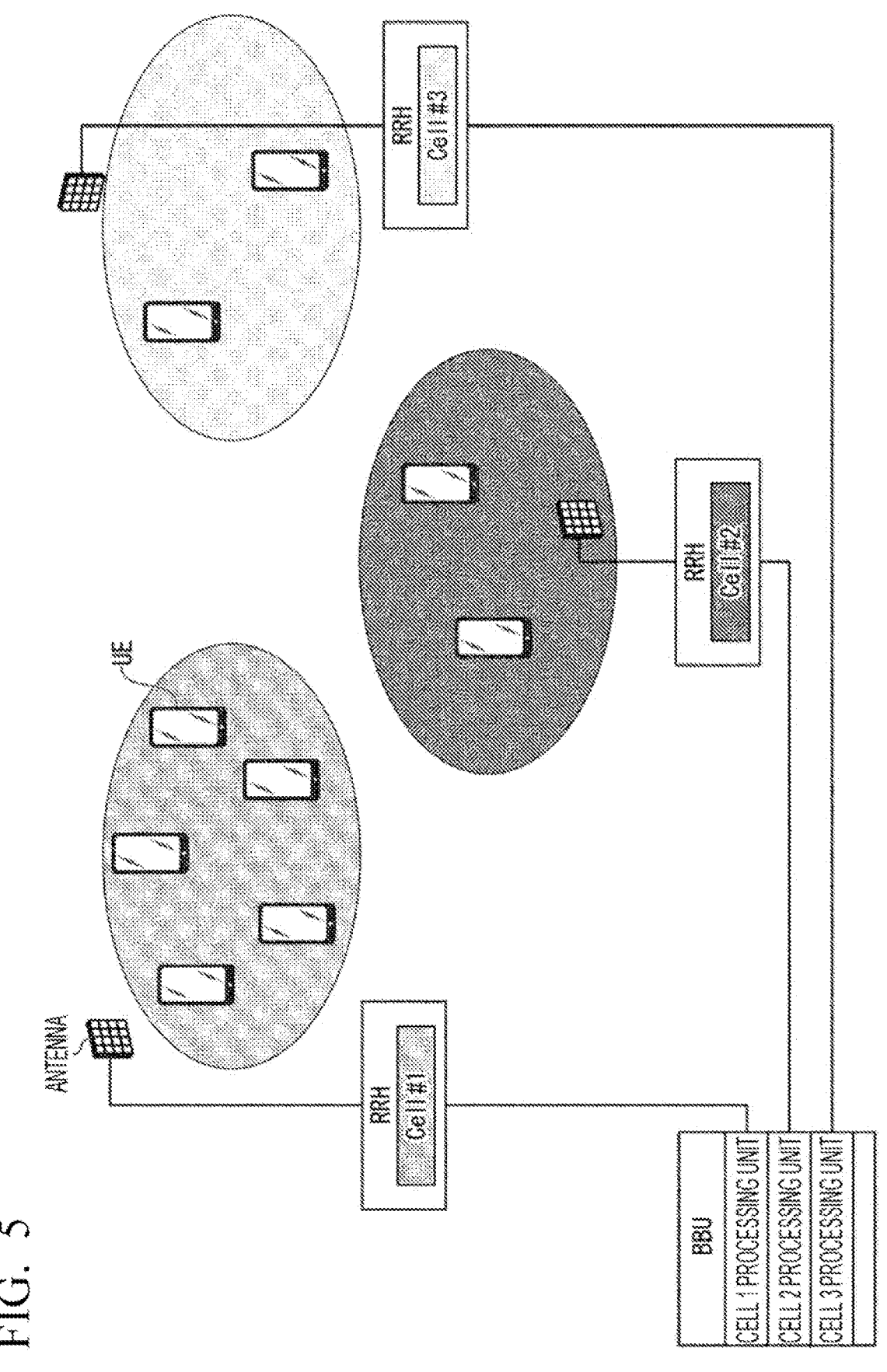
FIG. 5 is a diagram illustrating a configuration of a conventional technology.
Figure 6:
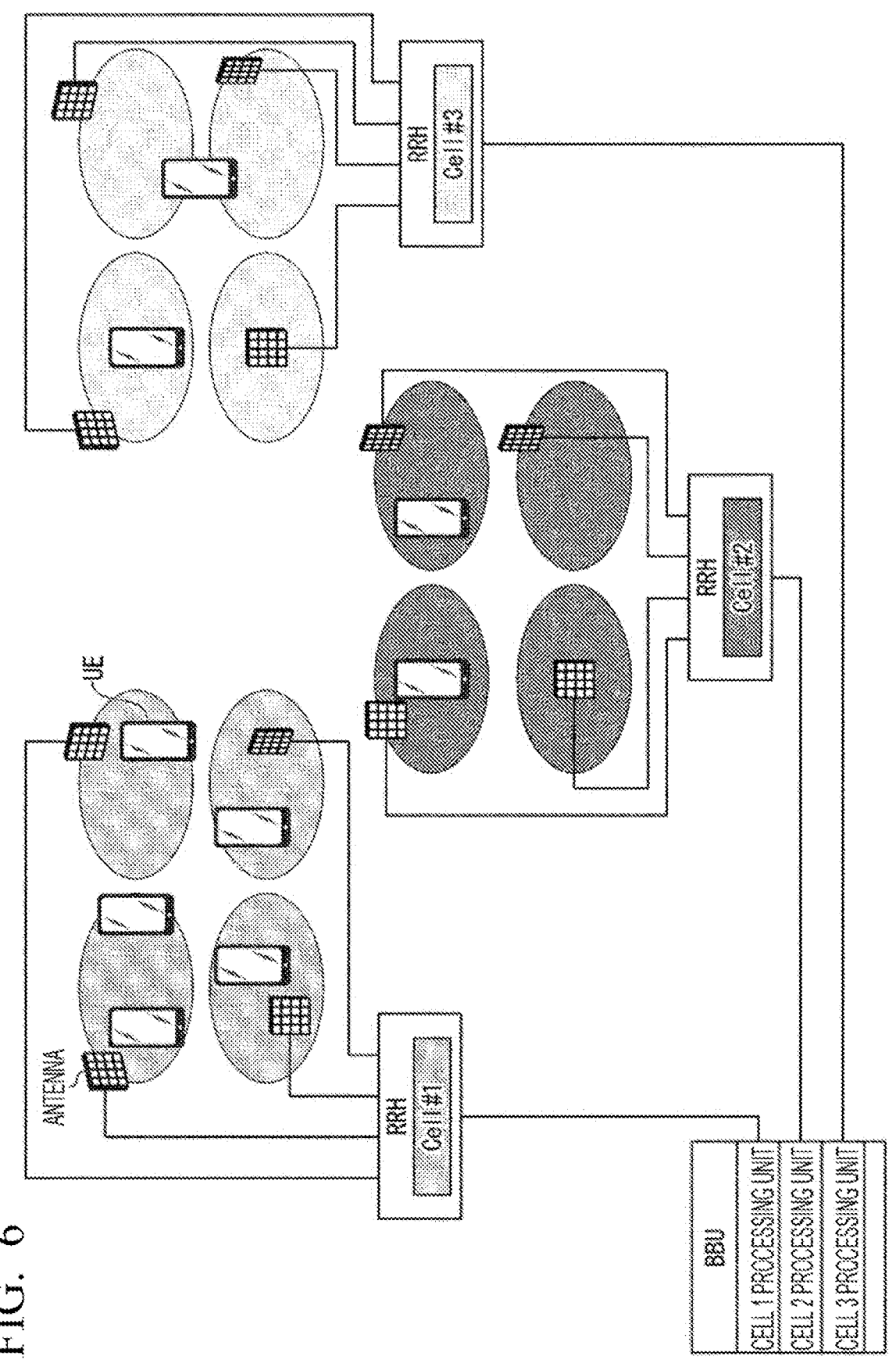
FIG. 6 is a diagram illustrating a configuration of a conventional technology.

FIG. 3 is a flowchart illustrating a flow of processing of the CS 100. In FIG. 3, the assignment unit 50 performs initial assignment of assigning the distributed antenna 30 to be connected to the signal processing unit 10 (step S101). This assignment may be assigned according to setting by the station operator, may be assigned by equal assignment, or may be assigned according to the processing capability of the signal processing unit 10.

The acquisition unit 40 determines whether an acquisition event has arrived (step S102). For example, in a case where the acquisition event is acquired at predetermined time intervals, the acquisition event may be an arrival of the time or an acquisition instruction from a host device or the like.

When the acquisition event arrives (step S102: YES), the acquisition unit 40 acquires the above-described load information indicating the load of the signal processing unit 10 (step S103). The acquired load information is output to the assignment unit 50.

The assignment unit 50 determines whether to reassign the distributed antenna 30 connected to the signal processing unit 10 on the basis of the load information (step S104). Here, the assignment unit 50 may determine whether to perform the reassignment processing by comparing with a threshold set for each of the number of connected user terminals, the user throughput, the number of traffic buffers, or the calling failure rate. The assignment unit 50 may determine whether to perform the reassignment processing on the basis of the magnitude of the load bias of the signal processing unit 10. The assignment unit 50 may detect a failure (a failure such as a part of the distributed antenna 30 or the CS 100) and determine whether to perform the reassignment processing on the basis of the detection result.

As a result of the reassignment determination by the assignment unit 50, when it is not determined to perform the reassignment processing (step S105: NO), the assignment unit 50 does not perform reassignment processing and the process returns to step S102. On the other hand, when it is determined to perform the reassignment processing (step S105: YES), the assignment unit 50 performs the reassignment processing (step S105) and the process returns to step S102. In this reassignment, assignment is performed such that the loads of the plurality of signal processing units 10 are leveled.

Specifically, in the reassignment processing in step S106, reassignment is performed in units of distributed antenna 30. For example, reassignment processing is performed in which the distributed antenna 30 having the largest load is assigned to the signal processing unit 10 having the smallest load. Alternatively, reassignment processing is performed in which one of the distributed antennas 30 assigned to the signal processing unit 10 having the largest load is randomly selected and the selected distributed antenna 30 is assigned to the signal processing unit 10 having the smallest load. As a result, it is possible to follow the load variation.

In the flowcharts described above, leveling is performed according to the comparison result with the threshold. On the other hand, when a predetermined trigger other than the acquisition event arrives without comparison with the threshold, it may be determined whether to perform the reassignment processing, and leveling may be performed. Examples of the predetermined trigger include a time when the variation in the load of the signal processing unit 10 becomes large (a time when the variance becomes a predetermined value or more).

The load of the distributed antenna 30 varies depending on the day of the week and the time zone. Therefore, a statistic indicating the load of the distributed antenna 30 may be obtained in advance for each day of the week and each time zone, and the connection destination of the distributed antenna 30 may be assigned on the basis of the statistic in the reassignment processing in step S106. For example, when a statistic indicating that the number of UEs connected to the predetermined distributed antenna 30 increases around daytime on Sunday is obtained, the assignment may be performed such that the connection destination of the predetermined distributed antenna 30 is a different signal processing unit 10 in response to arrival of the daytime on Sunday.

In the embodiment described above, the switch 20 is provided outside the CS 100, but may be provided inside the CS 100. In the wireless communication system 1 according to the embodiment, the analog RoF technology is used as a communication method between the distributed antenna 30 and the signal processing unit 10, but a digital. ROF technology may be used instead of the analog RoF technology. This is because the processing of leveling the loads of the plurality of signal processing units does not depend on the communication method between the distributed antenna 30 and the signal processing unit 10.

(Modification)

In the wireless communication system 1, the CS 100 is connected to the distributed antenna 30 via the switch 20, but may have a configuration using a plurality of CSs and switches. FIG. 7 illustrates a configuration example of a wireless communication system 1000 using a plurality of CSs and switches. The wireless communication system 1000 includes a plurality of (M: M is an integer of 2 or more) CSs 100-1, 100-2, . . . , and 100-M.

The CSs 100-1, 100-2, . . . , 100-M are connected to the distributed antenna 30 via the switch 200. In the wireless communication system 1000, the CSs 100-1, 100-2, . . . , 100-M and the switch 200 are connected by one signal line, but this is an example, and may be connected by a plurality of signal lines.

In the wireless communication system 1000, each of the CSs 100-1, 100-2, . . . , and 100-M includes one or more signal processing units, but the switch 200 may have functions corresponding to the acquisition unit and the assignment unit without including the acquisition unit and the assignment unit described in FIG. 2. Alternatively, an operation system (OPS) of a higher order than the CSs 100-1, 100-2, . . . , 100-M may be provided, and functions corresponding to the acquisition unit, the assignment unit, and the setting unit may be implemented by the OPS. Alternatively, the functions corresponding to the acquisition unit and the assignment unit may be implemented by exchanging the load information and the assignment information between the CSs 100-1, 100-2, . . . , 100-M. In the wireless communication system 1000, in a case where the CSs 100-1, 100-2, . . . , 100-M have an acquisition unit and an assignment unit, it may be function as the acquisition unit and the assignment unit to be assigned to the signal processing units included in the CSs themselves.

As described above, when the present embodiment is applied even when spanning a plurality of CSs, not only the distribution of the load information but also the redundancy at the time of failure of the CS can be secured.

The acquisition unit 40 and the assignment unit 50 include a processor such as a central processing unit (CPU) and a memory. In this case, the acquisition unit 40 and the assignment unit 50 function as the acquisition unit 40 and the assignment unit 50 by the processor executing a program. All or some of the functions of the acquisition unit 40 and the assignment unit 50 may be realized by using hardware such as an application specific integrated circuit (ASIC), a programmable logic device (PLD), or a field programmable gate array (FPGA). The program may be recorded in a computer-readable recording medium. Examples of the computer-readable recording medium include a portable medium such as a flexible disk, a magneto-optical disk, a ROM, a CD-ROM, and a semiconductor storage device (for example, a solid state drive (SSD)), and a storage device such as a hard disk and a semiconductor storage device incorporated in a computer system. The program may be transmitted via a telecommunication line.

While the embodiments of this invention have been described in detail with reference to the drawings, specific configurations are not limited to these embodiments, and include designs and the like without departing from the spirit of this invention.

INDUSTRIAL APPLICABILITY

The present invention is applicable to a wireless communication system having a relatively large load fluctuation such as a large change in the number of user terminals connected.

REFERENCE SIGNS LIST

1 Wireless communication system
10 Signal processing unit
20 Switch
30 Distributed antenna
40 Acquisition unit
50 Assignment unit
100 CS

The invention claimed is:

1. A control method in a wireless communication system including a plurality of distributed antennas that perform wireless communication with a user terminal, and a plurality of signal processing units that are connected to the plurality of distributed antennas and perform signal processing,

the control method comprising:

assigning a distributed antenna to be connected to a signal processing unit;

acquiring load information indicating a load of the signal processing unit;

determining whether to reassign the distributed antenna to be connected to the signal processing unit based on the load information acquired in the acquiring; and performing reassignment and leveling loads of the plurality of signal processing units when it is determined to reassign in the determining, wherein the performing of the reassignment and leveling includes, selecting one of the plurality of distributed antennas assigned to the signal processing unit whose the load is largest, and assigning a selected distributed antenna to the signal processing unit whose the load is lowest.

2. The control method according to claim 1, wherein, in the assigning and the performing of the reassignment and leveling, the signal processing unit as a connection destination of the distributed antenna is assigned by using a switch that switches the connection destination of the distributed antenna.

3. The control method according to claim 1, wherein the load information indicates either a user throughput in a user terminal that performs wireless communication with the distributed antenna, or a calling failure rate in the signal processing unit.

4. The control method according to claim 1, wherein, in the performing of the reassignment and leveling, the signal processing unit as the connection destination of the distributed antenna is assigned based on a statistic indicating a load of the distributed antenna.

5. The control method according to claim 1, wherein, in the determining, it is determined whether to reassign the distributed antenna to be connected to the signal processing unit on a basis of a change in the variation in the loads among the plurality of signal processing units.

6. A wireless communication system comprising a plurality of distributed antennas that perform wireless communication with a user terminal, and a plurality of signal processing units that are connected to the plurality of distributed antennas and perform signal processing, the wireless communication system comprising:

an assignor that assigns a distributed antenna to be connected to a signal processing unit;

an acquirer that acquires load information indicating loads of the signal processing unit;

a determiner that determines whether to reassign the distributed antenna to be connected to the signal processing unit based on the load information acquired by the acquirer; and a re-assignor that performs reassignment and levels loads of the plurality of signal processing units when it is determined to reassign by the determiner, wherein the re-assignor selects one of the plurality of distributed antennas assigned to the signal processing unit whose the load is largest, and assigns a selected distributed antenna to the signal processing unit whose the load is lowest.

7. A control method in a wireless communication system including a plurality of distributed antennas that perform wireless communication with a user terminal, and a plurality of signal processing units that are connected to the plurality of distributed antennas and perform signal processing, the control method comprising:

assigning a distributed antenna to be connected to a signal processing unit;

acquiring load information indicating a load of the signal processing unit;

determining whether to reassign the distributed antenna to be connected to the signal processing unit based on the load information acquired in the acquiring; and performing reassignment and leveling loads of the plurality of signal processing units when it is determined to reassign in the determining, wherein, in the determining, it is determined whether to reassign the distributed antenna to be connected to the signal processing unit on a basis of a magnitude of a bias in the loads among the plurality of signal processing units.

* * * * *